US009900133B2

(12) United States Patent
Lu et al.

(10) Patent No.: US 9,900,133 B2
(45) Date of Patent: Feb. 20, 2018

(54) METHOD AND COMMUNICATION DEVICE FOR CONTROLLING BEAM-FORMING TRACKING

(71) Applicant: Telefonaktiebolaget L M Ericsson (publ), Stockholm (SE)

(72) Inventors: Qianxi Lu, Beijing (CN); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 319 days.

(21) Appl. No.: 14/652,441

(22) PCT Filed: Jun. 1, 2015

(86) PCT No.: PCT/CN2015/080469
§ 371 (c)(1),
(2) Date: Jun. 15, 2015

(87) PCT Pub. No.: WO2016/192002
PCT Pub. Date: Dec. 8, 2016

(65) Prior Publication Data
US 2017/0141892 A1     May 18, 2017

(51) Int. Cl.
*H04L 5/00* (2006.01)
*H04B 7/06* (2006.01)
*H04W 72/04* (2009.01)

(52) U.S. Cl.
CPC ......... *H04L 5/0048* (2013.01); *H04B 7/0617* (2013.01); *H04W 72/046* (2013.01)

(58) Field of Classification Search
None
See application file for complete search history.

(56) References Cited

U.S. PATENT DOCUMENTS

2007/0054617 A1 * 3/2007 Nikolajevic ......... H04B 7/0619
                                                                455/41.2
2009/0067539 A1    3/2009 Maltsev et al.
(Continued)

FOREIGN PATENT DOCUMENTS

CN    102804626 A    11/2012
CN    104584325 A    4/2015

OTHER PUBLICATIONS

Carlos Cordeiro et al., "IEEE P802.11 Wireless LANs," IEEE 802.11-10/0433r2, May 2010, pp. 1-335.
(Continued)

*Primary Examiner* — Kevin C Harper
*Assistant Examiner* — Derrick V Rose
(74) *Attorney, Agent, or Firm* — Nicholson De Vos Webster & Elliott, LLP (57) ABSTRACT

A method in a communication device for controlling beam-forming (BF) tracking is disclosed. The method comprises switching the communication device from a coarse BF tracking state to a non-BF tracking state when a first timer expires. The communication device transmits pilot signals for BF tracking, feedback information for BF tracking or both the pilot signals and the feedback information more frequently in the coarse BF tracking state than in the non-BF tracking state. Additionally or alternatively, the method comprises switching the communication device from a fine BF tracking state to a coarse BF tracking state or a non-BF tracking state when a second timer expires. The communication device transmits pilot signals for BF tracking, feedback information for BF tracking or both the pilot signals and the feedback information more frequently in the fine BF tracking state than in the coarse BF tracking state.

18 Claims, 5 Drawing Sheets

(56) References Cited

U.S. PATENT DOCUMENTS

| | | | |
|---|---|---|---|
| 2011/0002373 A1* | 1/2011 | Jeon | H04B 7/043 375/228 |
| 2013/0083774 A1 | 4/2013 | Son et al. | |
| 2013/0182683 A1* | 7/2013 | Seol | H04W 72/04 370/335 |
| 2014/0055302 A1* | 2/2014 | Jia | H01Q 3/34 342/372 |
| 2016/0095102 A1* | 3/2016 | Yu | H04L 5/0057 455/452.2 |

OTHER PUBLICATIONS

International Search Report and Written Opinion for Application No. PCT/CN2015/080469, dated Feb. 24, 2016, 11 pages.

\* cited by examiner

METHOD AND COMMUNICATION DEVICE FOR CONTROLLING BEAM-FORMING TRACKING

CROSS-REFERENCE TO RELATED APPLICATIONS

This application is a National stage of International Application No. PCT/CN2015/080469, filed Jun. 1, 2015, which is hereby incorporated by reference.

TECHNICAL FIELD

The present disclosure generally relates to the beam-forming (BF) technology, and particularly, to a method in a communication device for controlling BF tracking and the associated communication device.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

To satisfy the ever-increasing demand from networked society either on huge traffic volume or very low latency, it has been agreed that two strategies shall be applied, one of which is to densify wireless networks (that is, to deploy more access nodes (ANs) in the wireless networks) and the other of which is to exploit very high frequency spectrum (such as the frequency range of tens of GHz).

However, on one hand, the propagation, penetration and diffraction attenuations at such high frequency spectrum are much higher. On the other hand, the receiver antenna aperture which characterizes how well the receiver can collect electromagnetic energy from incoming electromagnetic waves is frequency dependent. Due to these facts, the link budget would deteriorate dramatically for the same link if said high frequency spectrum is used instead of the conventional low frequency spectrum. To combat this disadvantage, BF technology has been applied in order to compensate for the deteriorated link budget at the high frequency spectrum.

Figure 1:
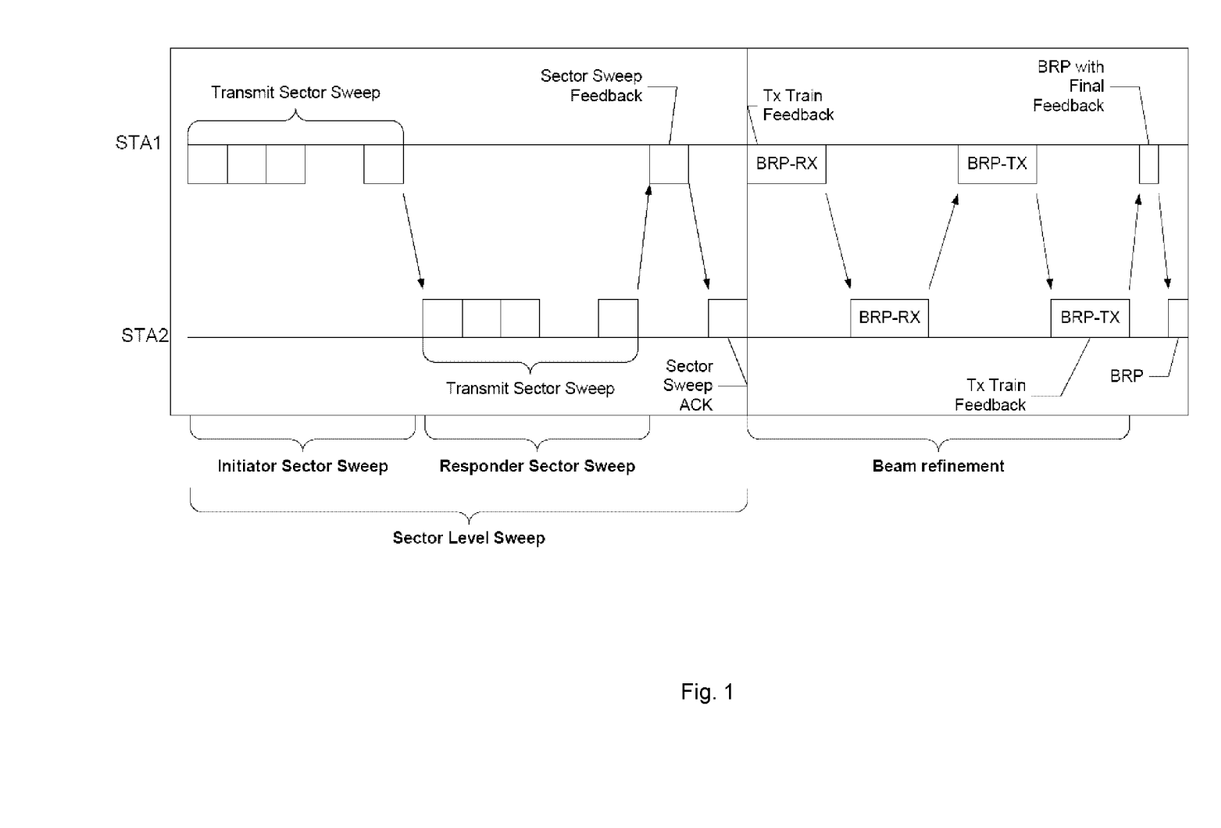
FIG. 1 is a diagram illustrating a BF procedure according to the prior art.

FIG. 1 is a diagram illustrating a BF procedure according to the prior art, which generally comprises a beam sweeping stage (denoted as "sector level sweep" in the figure) and a beam refinement stage (denoted as "beam refinement" in the figure) followed by a beam tracking stage (not shown in the figure). During the beam sweeping stage, a pair of wireless communication devices (for example, an access node (AN) and a terminal device), between which the BF procedure is performed, transmit BF training sequences to each other and receive corresponding feedback information from each other at a low data rate to determine initial antenna system setting for both transmission and reception. Then, it proceeds to the beam refinement stage, where the antenna settings are further tuned to narrow the wide beam formed in the beam sweeping stage, thereby achieving an improved BF gain which enables high-quality and high-rate communications between the pair of wireless communication devices. Next, during the beam tracking stage, the narrow beam formed in the beam refinement stage is tracked to keep the refined antenna settings up to date, as the channel condition between the pair of wireless communication devices changes over time (for example, due to the mobility of the terminal device). More detailed description for the prior art BF procedure can be found in for example Institute of Electrical and Electronics Engineers (IEEE) 802.11-10/0433r2.

As a first possible implementation, the BF procedure may stay in the beam tracking stage after previous traffic data has been transmitted between the pair of wireless communication devices and may thus be always ready for forthcoming traffic data transmission (that is, there is no need to go through the beam sweeping stage and beam refinement stage again for the forthcoming traffic data transmission).

Alternatively, as a second possible implementation, the BF procedure may be terminated after previous traffic data has been transmitted and may be restarted for forthcoming traffic data transmission (that is, it is necessary to sequentially go through the beam sweeping stage, the beam refinement stage and the beam tracking stage once more whenever new traffic data is to be transmitted).

As compared with the second implementation, the first implementation might cause ineffective power consumption and signaling overhead for tracking the narrow beam formed in the beam refinement stage after the previous traffic data has been transmitted, in case there is a large time interval between the previous and the forthcoming traffic data transmissions.

On the other hand, in case the time interval between the previous and the forthcoming traffic data transmissions is relatively small, the second implementation would cause an intolerable latency for the forthcoming traffic data transmission.

SUMMARY

An object of the present disclosure is to overcome or at least alleviate some of the above-described disadvantages in the prior art.

According to a first aspect of the present disclosure, there is provided a method in a communication device for controlling BF tracking. The method comprises switching the communication device from a coarse BF tracking state to a non-BF tracking state when a first timer expires. The communication device transmits pilot signals for BF tracking, feedback information for BF tracking or both the pilot signals and the feedback information more frequently in the coarse BF tracking state than in the non-BF tracking state. Additionally or alternatively, the method comprises switching the communication device from a fine BF tracking state to a coarse BF tracking state or a non-BF tracking state when a second timer expires. The communication device transmits pilot signals for BF tracking, feedback information for BF tracking or both the pilot signals and the feedback information more frequently in the fine BF tracking state than in the coarse BF tracking state. By triggering switching from the fine BF tracking state to the coarse or non-BF tracking state upon expiration of the second timer instead of always tracking the narrow beam formed in the beam refinement stage, it is possible to reduce the power consumption for BF in case there is a relatively large time interval between the forthcoming traffic data transmission and the previous traffic data transmission. Moreover, it is possible to achieve a reduced latency as compared with repeating the beam sweeping and beam refinement stages whenever new traffic data is to be transmitted, in case the time interval between the forthcoming traffic data transmission and the previous traffic data transmission is relatively small. Thus, a tradeoff between energy efficiency and timeliness of the BF-assisted traffic data transmission can be achieved. Likewise, the tradeoff can also be achieved by triggering switching from the coarse BF tracking state to the non-BF tracking state upon expiration of the first timer.

According to a second aspect of the present disclosure, there is provided a communication device for controlling BF tracking. The communication device comprises a transceiver and a switching unit. The transceiver is configured to transmit pilot signals for BF tracking, feedback information for BF tracking or both the pilot signals and the feedback information. The switching unit is configured to switch the communication device from a coarse BF tracking state to a non-BF tracking state when a first timer expires. Additionally or alternatively, the switching unit is configured to switch the communication device from a fine BF tracking state to a coarse BF tracking state or a non-BF tracking state when a second timer expires. The transceiver is configured to transmit the pilot signals, the feedback information or both the pilot signals and the feedback information more frequently in the coarse BF tracking state than in the non-BF tracking state, and more frequently in the fine BF tracking state than in the coarse BF tracking state.

According to a third aspect of the present disclosure, there is provided a communication device for controlling BF tracking. The communication device comprises a transceiver, a processor and a memory. The memory has computer-executable program code stored therein. When executed by the processor, the program code causes the communication device to perform the method according to the first aspect of the present disclosure.

According to a fourth aspect of the present disclosure, there is provided a non-transitory computer readable storage medium that stores computer code instructions which when executed by a processor cause the processor to perform the method according to the first aspect of the present disclosure.

According to a fifth aspect of the present disclosure, there is provided a computer program product comprising a computer readable medium and a computer program according to the fourth aspect of the disclosure stored on the computer readable medium.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, application specific integrated circuits (ASICs), programmable logical arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to ASIC(s) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 2:
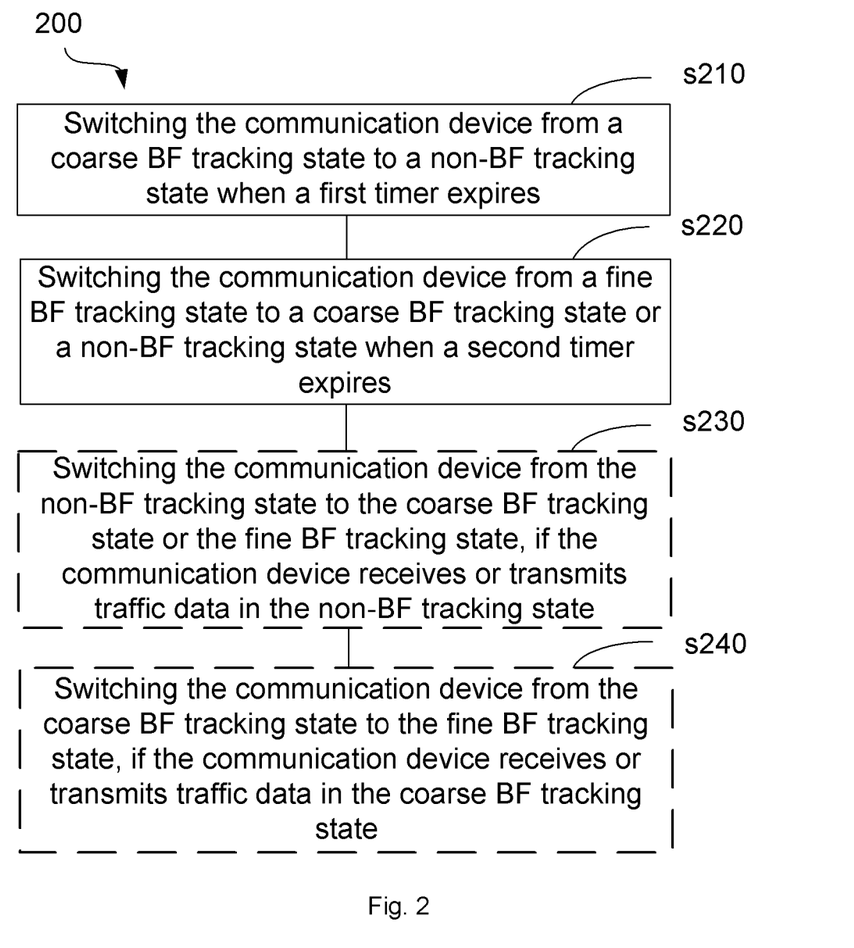
FIG. 2 is a flowchart illustrating a method in a communication device for controlling BF tracking according to the present disclosure.

FIG. 2 schematically illustrates a method 200 in a communication device for controlling BF tracking according to the present disclosure.

As illustrated, the method may comprise switching the communication device from a coarse BF tracking state to a non-BF tracking state when a first timer expires, at step s210.

Additionally or alternatively, the method may comprise switching the communication device from a fine BF tracking state to a coarse BF tracking state when a second timer expires, or from a fine BF tracking state to a non-BF tracking state when a second timer expires, at step s220.

Note that, in case the method comprises both steps 210 and s220, step s220 may be performed before or after step s210 as will be further explained with reference to FIG. 3, although only the latter case is illustrated in FIG. 2.

Here, the non-BF tracking state, the coarse BF tracking state and the fine BF tracking state shall be interpreted as different states during the above-described beam tracking stage which are distinguished by how frequently pilot signals and/or feedback information for BF tracking are transmitted. Specifically, the communication device transmits pilot signals and/or feedback information for BF tracking more frequently in the coarse BF tracking state than in the non-BF tracking state, and more frequently in the fine BF tracking state than in the coarse BF tracking state. Accordingly, the granularity of the beam tracked and hence the BF gain is higher in the coarse BF tracking state than in the non-BF tracking state, and higher in the fine BF tracking state than in the coarse BF tracking state.

By triggering switching from the fine BF tracking state to the coarse or non-BF tracking state upon expiration of the second timer instead of always tracking the narrow beam formed in the beam refinement stage, it is possible to reduce the power consumption for BF in case there is a relatively large time interval between the forthcoming traffic data transmission and the previous traffic data transmission. Moreover, it is possible to achieve a reduced latency as compared with repeating the beam sweeping and beam refinement stages whenever new traffic data is to be transmitted, in case the time interval between the forthcoming traffic data transmission and the previous traffic data transmission is relatively small. Thus, a tradeoff between energy efficiency and timeliness of the BF-assisted traffic data transmission can be achieved. The tradeoff can also be achieved by triggering switching from the coarse BF tracking state to the non-BF tracking state upon expiration of the first timer.

Supposing the BF procedure is performed between an AN and a terminal device, a downlink (DL) transmit (TX) beam tracking process, a DL receive (RX) beam tracking process, an uplink (UL) TX beam tracking process and an UL RX beam tracking process may be performed in each of the above three BF tracking states.

For the DL TX beam tracking process, a pilot signal may be transmitted in the DL direction (that is, from the AN to the terminal device) to be measured at the terminal device, and then feedback information may be transmitted in the UL direction (that is, from the terminal device to the AN) to inform the AN of one or more preferred DL TX beams. For the DL RX beam tracking process, a pilot signal may be transmitted on the preferred TX beams in the DL direction, and the terminal device can be aware of preferred DL RX beam(s) based on measurement(s) of the pilot signal.

Likewise, for the UL TX beam tracking process, a pilot signal may be transmitted in the UL direction to be measured by the AN, and then feedback information may be transmitted in the DL direction to inform the terminal device of one or more preferred UL TX beams. For the UL RX beam tracking process, a pilot signal may be transmitted on the preferred UL TX beams in the UL direction, and the AN can be aware of preferred UL RX beam(s) based on measurement(s) of the pilot signal.

By way of example, the pilot signal as used herein may refer to terminal device-specific reference symbols (RS's) for both DL and UL, such as Channel State Information RS's (CSI-RS's) for DL and Sounding RS's (SRS's) whose periodicity and antenna weight can be configured in a terminal device-specific manner. The resource position of the pilot signal may be indicated by DL Radio Resource Control (RRC) signaling, from the AN to the terminal device.

The feedback information may be transmitted as UL PHY channel signaling (such as channel state information (CSI)) and DL PHY channel signaling (such as DCI) or as payload (e.g., media access control (MAC) control element) on the physical downlink shared channel (PDSCH).

Note that it is not mandatory to perform all the above four beam tracking processes in any of the non-BF tracking state, the coarse BF tracking state and the fine BF tracking state. For example, in the non-BF tracking state, it is possible to perform no beam tracking process at all or perform only the DL RX beam tracking process. In the coarse and fine BF tracking states, it is possible to perform DL and/or UL TX and/or RX beam tracking processes. In case omni-directional RX antennas are used at the terminal device and/or the AN, DL and/or UL RX beam tracking processes need not to be performed. In case omni-directional TX and RX antennas are used at the terminal device, the UL TX beam tracking process and the DL RX beam tracking process need not to be performed.

In an implementation, the first timer and the second timer may be stared independently, when the communication device enters the coarse BF tracking state and the fine BF tracking state respectively. In this case, the communication device may operate in the fine BF tracking state when the second timer is running and operate in the coarse BF tracking state when the first timer is running and the second timer is not running. The communication device may be switched from the fine BF tracking state to the coarse BF tracking state when the second timer expires and the first timer is running, from the fine BF tracking state to the non-BF tracking state when the first timer is not running and the second timer expires, and from the coarse BF tracking state to the non-BF tracking state when the first timer expires and the second timer is not running.

Note that the expression "the first/second timer is not running" is intended to refer to the following two cases: (1) the first/second timer was started but has expired; and (2) the first/second timer has not been started yet.

In an alternative implementation, the first timer may be started after the second timer expires, and the second timer may be started when the communication device enters the fine BF tracking state. In this case, the communication device may operate in the fine BF tracking state when the second timer is running and operate in the coarse BF tracking state when the first timer is running. The communication device may be switched from the fine BF tracking state to the coarse BF tracking state when the second timer expires, and may be switched from the coarse BF tracking state to the non-BF tracking state when the first timer expires.

In both of the above implementations, the communication device may be switched from the fine BF tracking state or the coarse BF tracking state to the non-BF tracking state when a Time Alignment Timer (TAT) expires or when the communication device, which is a terminal device, is released to an idle state, because both the expiration of the TAT and the idle state of the terminal device prevent the terminal device from performing UL communications and limit its ability to perform DL communications.

Referring back to FIG. 2, the method 200 may further comprise step s230, at which the communication device is switched from the non-BF tracking state to the coarse BF tracking state or the fine BF tracking state, if the communication device is scheduled to receive or transmit traffic data in the non-BF tracking state. Accordingly, the first timer or the second timer may be started.

Additionally or alternatively, the method 200 may further comprise step s240, at which the communication device is switched from the coarse BF tracking state to the fine BF tracking state, if the communication device receives or transmits traffic data in the coarse BF tracking state. Accordingly, the second timer may be started.

Note that, in case the method comprises both steps s230 and s240, step s240 may be performed before or after step s230, although only the latter case is illustrated in FIG. 2.

Figure 3:
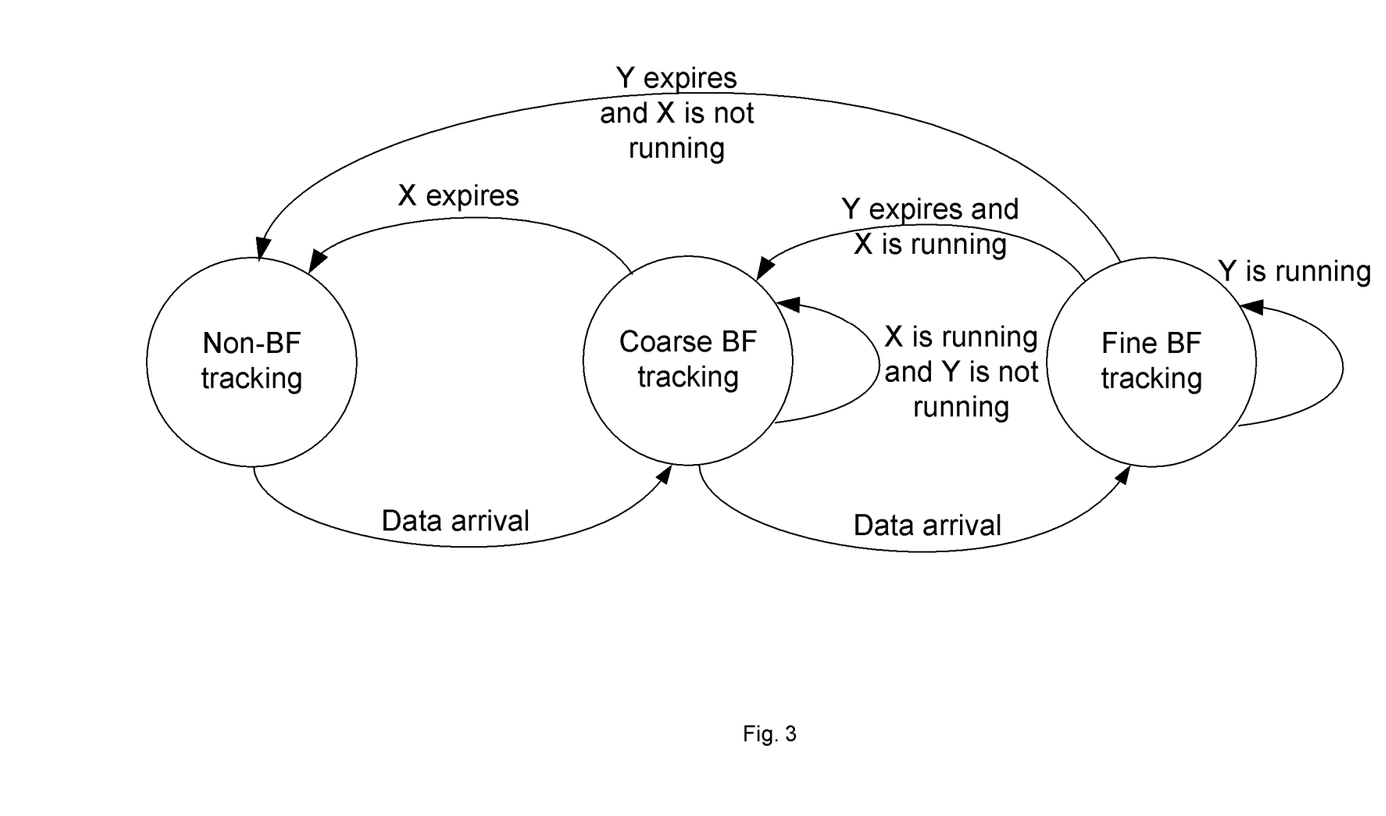
FIG. 3 is a state transition diagram illustrating switching of a communication device among a non-BF tracking state, a coarse BF tracking state and a fine BF tracking state according to an embodiment of the present disclosure.

To facilitate a better understanding of the proposed solutions, FIG. 3 depicts how a communication device may be switched among a non-BF tracking state, a coarse BF tracking state and a fine BF tracking state according to an embodiment of the disclosure where the first timer and the second timer may be started independently.

As illustrated, the communication device may be switched from the coarse BF tracking state to the non-BF tracking state when a first timer (denoted as X) expires, from the fine BF tracking state to the coarse BF tracking state when a second timer (denoted as Y) expires and X is running, and from the fine BF tracking state to the non-BF tracking state when Y expires and X is not running.

The communication device may keep operating in the fine BF tracking state when the second timer is running and keep operating in the coarse BF tracking state when the first timer is running and the second timer is not running.

Additionally, the communication device may be switched from the non-BF tracking state to the coarse BF tracking state if the communication device is scheduled to receive or transmit traffic data in the non-BF tracking state, and from the coarse BF tracking state to the fine BF tracking state if the communication device receives or transmits traffic data in the coarse BF tracking state.

As those skilled in the art will appreciate, the state transition scheme shown in FIG. 3 is given for illustrative purposes only and various other state transition schemes may be applicable in practical implementation. For example, in case the first timer is started after the second timer expires, the communication device can only be switched from the fine BF tracking state to the coarse BF tracking state when the second timer expires. The communication device may be switched from the non-BF tracking state to the fine BF tracking state instead of or in addition to the coarse BF tracking state.

Note that the communication device may also be switched from the fine BF tracking state or the coarse BF tracking state to the non-BF tracking state when the TAT expires or when the communication device, which is a terminal device, is released to an idle state as described above, although this is not shown in FIG. 3.

As can be seen from FIG. 3, the communication device may be first switched from the fine BF tracking state to the coarse BF tracking state and then to the non-BF tracking state. It is also possible for the communication device to be first switched from the coarse BF tracking state to the non-BF tracking state, then switched to the fine BF tracking state and next switched back to the coarse BF tracking state or to the non-BF tracking state. Thus, step s220 may be performed before or after step s210 as mentioned above. Likewise, step s240 may be performed before or after step s230.

In an embodiment, the first timer and/or the second timer may be set based on at least one of traffic characteristics of the communication device and mobility characteristics of a terminal device which is the communication device or communicates with the communication device.

Specifically, the first timer and/or the second timer may be set shorter in case traffic data is to be transmitted to or received from the communication device at a larger time interval. By way of example, supposing the time interval may take values from a range [0, T], with T denoting the maximum possible time interval. In practical implementation, the range [0, T] may be divided into a number of (for example three) segments, such as [0, T1), [T1, T2), [T2, T], with $0<T1<T2<T$. Then, a corresponding number of descending first timer values, denoted as t1, t2 and t3 ($t1>t2>t3>0$), may be associated respectively with the segments [0, T1), [T1, T2) and [T2, T]. In case the time interval falls within one of [0, T1), [T1, T2) and [T2, T], the first timer value is set to the corresponding one of t1, t2 and t3. Likewise, given a range of time interval [0, T'] which may be divided into a number of (for example three) segments, such as [0, T1'), [T1', T2'), [T2', T'], a corresponding number of second timer values, denoted as t1', t2' and t3', may be associated respectively with the segments [0, T1'), [T1', T2') and [T2', T']. Here, T' denotes the maximum possible time interval, $0<T1'<T2'<T'$ and $t1'>t2'>t3'>0$.

Note that the setting of the first timer and the setting of the second timer may be independent of or consistent with each other. That is, the maximum possible time interval T may be different from or the same as each other, the division of the range of the time interval [0, T] may be different from or the same as the division of the range of the time interval [0, T'] in case T=T', and the values t1, t2 and t3 set for the first timer may be different from or the same as the values t1', t2' and t3' set for the second timer in case T=T', T1=T1' and T2=T2'.

As such, it is possible to further reduce the time period during which there is no traffic data transmission but the communication device operates in the coarse BF tracking state and/or the fine BF tracking state and thus further reduce the power consumption for BF, in case the time interval between traffic data transmissions is relatively large. Also, it is possible to ensure that the communication device continuously operates in the BF tracking state and thus the traffic data transmission latency is low, in case the time interval between traffic data transmissions is relatively small.

Considering that the power consumption for BF tracking associated with a terminal device becomes higher as the terminal device moves faster, it may be preferable to set the first timer and/or the second timer shorter in case the terminal device moves at a higher speed. By way of example, supposing the moving speed may take values from a range [0, V], with V denoting the maximum possible moving speed. In practical implementation, the range [0, V] may be divided into a number of (for example three) segments, such as [0, V1), [V1, V2), [V2, V], with $0<V1<V2<V$. Then, a corresponding number of descending first timer values, denoted as t1, t2 and t3 ($t1>t2>t3>0$), may be associated respectively with the segments [0, V1), [V1, V2) and [V2, V]. In case the moving speed falls within one of [0, V1), [V1, V2) and [V2, V], the first timer value is set to the corresponding one of t1, t2 and t3. Also, the setting of the first timer and the setting of the second timer in dependence on the moving speed may be independent of or consistent with each other.

As such, it is possible to terminate coarse BF tracking and/or fine BF tracking for a fast-moving terminal device earlier and thus further reduce the power consumption for BF.

In practical implementation, the AN and the terminal device may set their timers respectively. Alternatively, in addition to its own timers, the AN may set the terminal device's timers and send the same to the terminal device via for example radio resource control (RRC) signaling.

In the following, a structure of a communication device 400 for controlling BF tracking according to the present disclosure will be described with reference to FIG. 4. The communication device 400 may be either an AN or a terminal device between which a BF procedure is performed.

Figure 4:
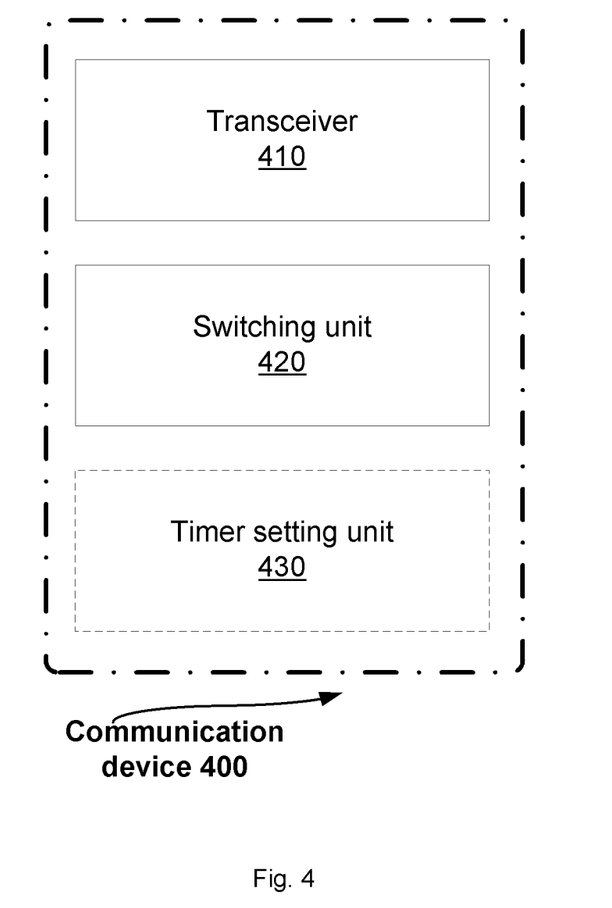
FIG. 4 is a schematic diagram illustrating a structure of a communication device for controlling BF tracking according to the present disclosure.

As illustrated in FIG. 4, the apparatus 400 comprises a transceiver 410 and a switching unit 420. The transceiver 410 is configured to transmit pilot signals and/or feedback information for BF tracking. The switching unit 420 is configured to switch the communication device from a coarse BF tracking state to a non-BF tracking state when a first timer expires. Additionally or alternatively, the switching unit 420 is configured to switch the communication device from a fine BF tracking state to a coarse BF tracking state or a non-BF tracking state when a second timer expires.

In an embodiment, the communication device 400 may operate in the fine BF tracking state when the second timer is running.

In an embodiment, the communication device 400 may operate in the coarse BF tracking state when the first timer is running and the second timer is not running.

In an embodiment, the switching unit 420 may be configured to switch the communication device 400 from the fine BF tracking state to the coarse BF tracking state when the second timer expires and the first timer is running. Alternatively, the switching unit 420 may be configured to switch the communication device 400 from the fine BF tracking state to the coarse BF tracking state when the second timer expires, in case the first timer is started after the second timer expires.

In an embodiment, the switching unit 420 may be configured to switch the communication device from the fine BF tracking state to the non-BF tracking state, when the first timer is not running and the second timer expires, when a Time Alignment Timer (TAT) expires, or when the communication device, which is a terminal device, is released to an idle state.

In an embodiment, the switching unit 420 may be configured to switch the communication device from the coarse BF tracking state to the non-BF tracking state, when the first timer expires and the second timer is not running, when a Time Alignment Timer (TAT) expires, or when the communication device, which is a terminal device, is released to an idle state.

In an embodiment, the switching unit 420 may be further configured to switch the communication device from the non-BF tracking state to the coarse BF tracking state or the fine BF tracking state, if the transceiver is scheduled to receive or transmit traffic data in the non-BF tracking state. Additionally or alternatively, the switching unit 420 may be further configured to switch the communication device from the coarse BF tracking state to the fine BF tracking state, if the transceiver receives or transmits traffic data in the coarse BF tracking state.

In an embodiment, the communication device 400 may further comprise a timer setting unit 430, which is configured to set the first timer and/or the second timer based on at least one of traffic characteristics of the communication device and mobility characteristics of a terminal device which is the communication device or communicates with the communication device.

In an embodiment, the timer setting unit 430 may be configured to set the first timer and/or the second timer shorter if traffic data is to be transmitted to or received from the communication device at a larger time interval. Additionally or alternatively, the timer setting unit 430 may be configured to set the first timer and/or the second timer shorter if the terminal device moves at a higher speed.

As those skilled in the art will appreciate, the above-described units may be implemented separately as suitable dedicated circuits. Nevertheless, these units can also be implemented using any number of dedicated circuits through functional combination or separation. In some embodiments, these units may be even combined in a single application specific integrated circuit (ASIC).

Figure 5:
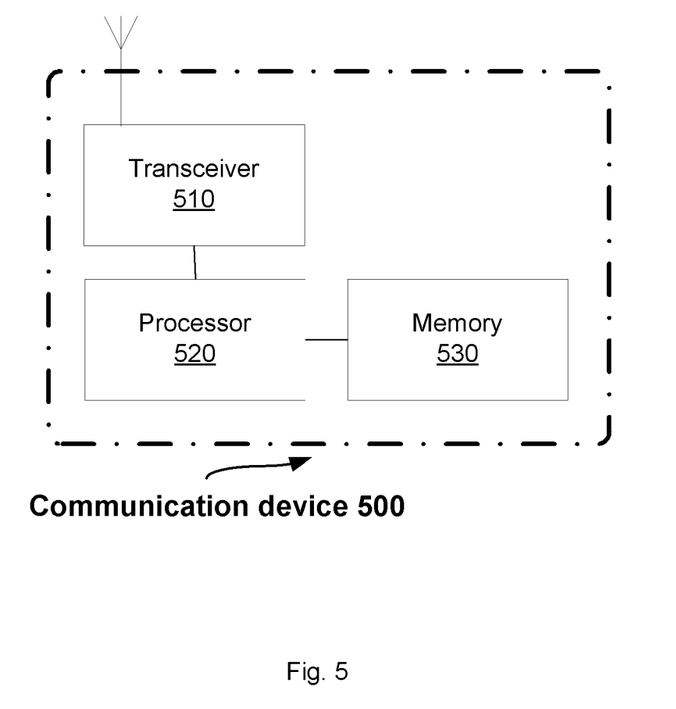
FIG. 5 is a block diagram illustrating an exemplary hardware implementation of a communication device according to the present disclosure.

As an alternative software-based implementation, there may be provided a communication device 500 comprising a transceiver 510, a processor 520 (including but not limited to a microprocessor, a microcontroller or a Digital Signal Processor (DSP), etc.) coupled to the transceiver 510, and a memory 530 coupled to the processor 520, as illustrated in FIG. 5. The memory 530 stores machine-readable program code executable by the processor 520. The processor 520, when executing the machine-readable program code, controls the transceiver 510 to transmit pilot signals for BF tracking, feedback information for BF tracking or both the pilot signals and the feedback information and acts as the above-described switching unit and timer setting unit.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method in a communication device for controlling beam-forming (BF) tracking, the method comprising at least one of:
    switching the communication device from a coarse BF tracking state to a non-BF tracking state when a first timer expires, wherein the communication device transmits pilot signals for BF tracking, feedback information for BF tracking or both the pilot signals and the feedback information more frequently in the coarse BF tracking state than in the non-BF tracking state; and
    switching the communication device from a fine BF tracking state to the coarse BF tracking state or the non-BF tracking state when a second timer expires, wherein the communication device transmits the pilot signals for BF tracking, the feedback information for BF tracking or both the pilot signals and the feedback information more frequently in the fine BF tracking state than in the coarse BF tracking state;
    wherein the first timer, the second timer, or both the first timer and the second timer are set based on at least one of traffic characteristics of the communication device and mobility characteristics of a terminal device which is the communication device or communicates with the communication device, wherein the traffic characteristics comprise a size of a time interval that traffic data is to be transmitted to or received from the communication device, and wherein the mobility characteristics comprise a moving speed of the terminal device.

2. The method of claim 1, wherein the communication device operates in the fine BF tracking state when the second timer is running.

3. The method of claim 1, wherein the communication device operates in the coarse BF tracking state when the first timer is running and the second timer is not running.

4. The method of claim 1, wherein the communication device is switched from the fine BF tracking state to the coarse BF tracking state, when the second timer expires and the first timer is running, or when the second timer expires, in case the first timer is started after the second timer expires.

5. The method of claim 1, wherein the communication device is switched from the fine BF tracking state to the non-BF tracking state, when the first timer is not running and the second timer expires, when a Time Alignment Timer (TAT) expires, or when the communication device, which is a terminal device, is released to an idle state.

6. The method of claim 1, wherein the communication device is switched from the coarse BF tracking state to the non-BF tracking state, when the first timer expires and the second timer is not running, when a Time Alignment Timer (TAT) expires, or when the communication device, which is a terminal device, is released to an idle state.

7. The method of claim 1, further comprising at least one of:

switching the communication device from the non-BF tracking state to the coarse BF tracking state or the fine BF tracking state, if the communication device is scheduled to receive or transmit traffic data in the non-BF tracking state; and switching the communication device from the coarse BF tracking state to the fine BF tracking state, if the communication device receives or transmits traffic data in the coarse BF tracking state.

8. A communication device for controlling beam-forming (BF) tracking, comprising:

a transceiver configured to transmit pilot signals for BF tracking, feedback information for BF tracking or both the pilot signals and the feedback information;

a switching unit configured to:

switch the communication device from a coarse BF tracking state to a non-BF tracking state when a first timer expires, switch the communication device from a fine BF tracking state to the coarse BF tracking state or the non-BF tracking state when a second timer expires, or switch the communication device from the coarse BF tracking state to the non-BF tracking state when the first timer expires and also switch the communication device from the fine BF tracking state to either the coarse BF tracking state or the non-BF tracking state when the second timer expires, wherein the transceiver is configured to transmit the pilot signals, the feedback information or both the pilot signals and the feedback information more frequently in the coarse BF tracking state than in the non-BF tracking state, and more frequently in the fine BF tracking state than in the coarse BF tracking state; and a timer setting unit configured to set the first timer, the second timer, or both the first timer and the second timer based on at least one of traffic characteristics of the communication device and mobility characteristics of a terminal device which is the communication device or communicates with the communication device, wherein the traffic characteristics comprise a size of a time interval that traffic data is to be transmitted to or received from the communication device, and wherein the mobility characteristics comprise a moving speed of the terminal device.

9. The communication device of claim 8, wherein the communication device operates in the fine BF tracking state when the second timer is running.

10. The communication device of claim 8, wherein the communication device operates in the coarse BF tracking state when the first timer is running and the second timer is not running.

11. The communication device of claim 8, wherein the switching unit is configured to switch the communication device from the fine BF tracking state to the coarse BF tracking state, when the second timer expires and the first timer is running, or when the second timer expires, in case the first timer is started after the second timer expires.

12. The communication device of claim 8, wherein the switching unit is configured to switch the communication device from the fine BF tracking state to the non-BF tracking state, when the first timer is not running and the second timer expires, when a Time Alignment Timer (TAT) expires, or when the communication device, which is a terminal device, is released to an idle state.

13. The communication device of claim 8, wherein the switching unit is configured to switch the communication device from the coarse BF tracking state to the non-BF tracking state, when the first timer expires and the second timer is not running, when a Time Alignment Timer (TAT) expires, or when the communication device, which is a terminal device, is released to an idle state.

14. The communication device of claim 8, wherein the switching unit is further configured to:

switch the communication device from the non-BF tracking state to the coarse BF tracking state or the fine BF tracking state, if the transceiver is scheduled to receive or transmit traffic data in the non-BF tracking state;

switch the communication device from the coarse BF tracking state to the fine BF tracking state, if the transceiver receives or transmits traffic data in the coarse BF tracking state; or switch the communication device from the non-BF tracking state to the coarse BF tracking state or the fine BF tracking state, if the transceiver is scheduled to receive or transmit traffic data in the non-BF tracking state and also switch the communication device from the coarse BF tracking state to the fine BF tracking state, if the transceiver receives or transmits traffic data in the coarse BF tracking state.

15. A non-transitory computer readable storage medium that stores computer code instructions which when executed by a processor of a communication device cause the processor to control beam-forming (BF) tracking by performing operations comprising at least one of:

switching the communication device from a coarse BF tracking state to a non-BF tracking state when a first timer expires, wherein the communication device transmits pilot signals for BF tracking, feedback information for BF tracking or both the pilot signals and the feedback information more frequently in the coarse BF tracking state than in the non-BF tracking state; and switching the communication device from a fine BF tracking state to the coarse BF tracking state or the non-BF tracking state when a second timer expires, wherein the communication device transmits the pilot signals for BF tracking, the feedback information for BF tracking or both the pilot signals and the feedback information more frequently in the fine BF tracking state than in the coarse BF tracking state;

wherein the first timer, the second timer, or both the first timer and the second timer are set based on at least one of traffic characteristics of the communication device and mobility characteristics of a terminal device which is the communication device or communicates with the communication device, wherein the traffic characteristics comprise a size of a time interval that traffic data is to be transmitted to or received from the communication device, and wherein the mobility characteristics comprise a moving speed of the terminal device.

16. A communication device for controlling beam-forming (BF) tracking, the communication device comprising:
a transceiver;
a processor; and
a memory, said memory having computer-executable program code stored therein which, when executed by the processor, causes the communication device to perform at least one of:
switching the communication device from a coarse BF tracking state to a non-BF tracking state when a first timer expires, wherein the communication device transmits pilot signals for BF tracking, feedback information for BF tracking or both the pilot signals and the feedback information more frequently in the coarse BF tracking state than in the non-BF tracking state; and
switching the communication device from a fine BF tracking state to the coarse BF tracking state or the non-BF tracking state when a second timer expires, wherein the communication device transmits the pilot signals for BF tracking, the feedback information for BF tracking or both the pilot signals and the feedback information more frequently in the fine BF tracking state than in the coarse BF tracking state;

wherein the first timer, the second timer, or both the first timer and the second timer are set based on at least one of traffic characteristics of the communication device and mobility characteristics of a terminal device which is the communication device or communicates with the communication device, wherein the traffic characteristics comprise a size of a time interval that traffic data is to be transmitted to or received from the communication device, and wherein the mobility characteristics comprise a moving speed of the terminal device.

17. The method of claim 1, wherein at least one of the first timer and the second timer is set to have a value based upon:
the size of the time interval, wherein when the size of the time interval meets or exceeds a first threshold, the value is smaller than when the size of the time interval is less than the first threshold; or
the moving speed, wherein when the moving speed meets or exceeds a second threshold, the value is smaller than when the moving speed is less than the second threshold.

18. The communication device of claim 8, wherein the timer setting unit is configured to set at least one of the first timer and the second timer to have a value based upon:
the size of the time interval, wherein when the size of the time interval meets or exceeds a first threshold, the value is smaller than when the size of the time interval is less than the first threshold; or
the moving speed, wherein when the moving speed meets or exceeds a second threshold, the value is smaller than when the moving speed is less than the second threshold.

* * * * *